United States Patent
Matsuoka

(10) Patent No.: US 7,961,254 B2
(45) Date of Patent: Jun. 14, 2011

(54) METHOD, SYSTEM AND COMPUTER-READABLE MEDIUM FOR DETECTING PULLDOWN SEQUENCE FROM INPUT INTERLACED IMAGES DEVICE

(75) Inventor: Hideki Matsuoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 463 days.

(21) Appl. No.: 11/907,410

(22) Filed: Oct. 11, 2007

(65) Prior Publication Data

US 2008/0118165 A1 May 22, 2008

(30) Foreign Application Priority Data

Oct. 11, 2006 (JP) ................................ 2006-278035

(51) Int. Cl.
*H04N 11/20* (2006.01)
(52) U.S. Cl. ...................................................... 348/454
(58) Field of Classification Search .................. 348/454, 348/459
See application file for complete search history.

(56) References Cited

U.S. PATENT DOCUMENTS

| | | | | |
|---|---|---|---|---|
| 6,469,745 B1* | 10/2002 | Yamada et al. | ............... | 348/558 |
| 6,965,414 B2* | 11/2005 | Haraguchi | ..................... | 348/441 |
| 7,075,581 B1* | 7/2006 | Ozgen et al. | .................. | 348/448 |
| 7,593,059 B2* | 9/2009 | Lee et al. | ..................... | 348/441 |
| 2002/0180888 A1* | 12/2002 | Komaki | ......................... | 348/558 |
| 2003/0115590 A1* | 6/2003 | Haraguchi | ...................... | 725/20 |
| 2005/0018767 A1* | 1/2005 | Lee | ............................. | 375/240.1 |

FOREIGN PATENT DOCUMENTS

| | | |
|---|---|---|
| JP | 3-58677 | 3/1991 |
| JP | 9-018784 | 1/1997 |
| JP | 2001-28735 | 1/2001 |
| JP | 2002-57993 | 2/2002 |
| JP | 2003-179884 | 6/2003 |
| JP | 2004-297476 | 10/2004 |

OTHER PUBLICATIONS

Chinese Office Action issued on Jun. 5, 2009 in corresponding Chinese Patent Application 200710152432.4.

* cited by examiner

*Primary Examiner* — James M Hannett
(74) *Attorney, Agent, or Firm* — Fujitsu Patent Center

(57) ABSTRACT

A 2:3 pulldown sequence detecting system includes a history data table that stores a correspondence between each input field and a determination result of whether each input field is a repeated field and a threshold value table that stores threshold values. The system compares pixels of each (or a first) field that forms an interlaced image with pixels of a third field one frame before the first field to calculate a difference absolute value, uses the threshold values to determine a distribution bias of the difference absolute value, detects, from the interlaced image, a repeated field candidate that occurs once in a five field cycle and fields other than the repeated field, and determines, based on a regularity of repeated field occurrence, whether each repeated field candidate is the repeated field. If any repeated field candidate is not the repeated field, the system controls the threshold values.

9 Claims, 9 Drawing Sheets

| FIELD | LARGE BIAS FLAG | SMALL BIAS FLAG | DETERMINATION RESULT | (THRESHOLD VALUE) |
|---|---|---|---|---|
| 1 | 1 | 0 | REPEATED FIELD | (a1) |
| 2 | 0 | 1 | FIELD OTHER THAN REPEATED FIELD | (b1) |
| 3 | 0 | 1 | FIELD OTHER THAN REPEATED FIELD | (b1) |
| 4 | 0 | 1 | FIELD OTHER THAN REPEATED FIELD | (c1) |
| 5 | 0 | 1 | FIELD OTHER THAN REPEATED FIELD | (d1) |
| 6 | 1 | 0 | REPEATED FIELD | (a1) |
| ⋮ | ⋮ | ⋮ | ⋮ | |

FIG.2A

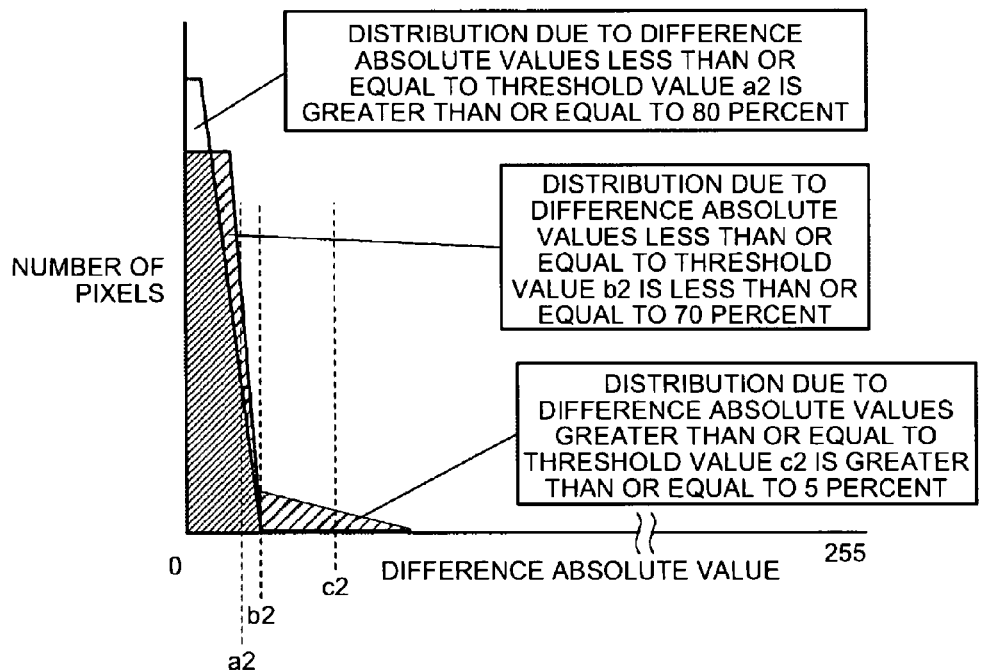

NUMBER OF PIXELS

DISTRIBUTION DUE TO DIFFERENCE ABSOLUTE VALUES LESS THAN OR EQUAL TO THRESHOLD VALUE a2 IS GREATER THAN OR EQUAL TO 80 PERCENT

DISTRIBUTION DUE TO DIFFERENCE ABSOLUTE VALUES LESS THAN OR EQUAL TO THRESHOLD VALUE b2 IS LESS THAN OR EQUAL TO 70 PERCENT

DISTRIBUTION DUE TO DIFFERENCE ABSOLUTE VALUES GREATER THAN OR EQUAL TO THRESHOLD VALUE c2 IS GREATER THAN OR EQUAL TO 5 PERCENT

DIFFERENCE ABSOLUTE VALUE

FIG.2B

| FIELD | LARGE BIAS FLAG | SMALL BIAS FLAG | DETERMINATION RESULT | (THRES-HOLD VALUE) |
|---|---|---|---|---|
| 1 | 1 | 0 | REPEATED FIELD | (a1) |
| 2 | 0 | 1 | FIELD OTHER THAN REPEATED FIELD | (b1) |
| 3 | 0 | 1 | FIELD OTHER THAN REPEATED FIELD | (b1) |
| 4 | 0 | 1 | FIELD OTHER THAN REPEATED FIELD | (c1) |
| 5 | 0 | 1 | FIELD OTHER THAN REPEATED FIELD | (b1) |
| 6 | 1 | 0 | REPEATED FIELD | (a1) |
| 7 | 1 | 0 | FIELD OTHER THAN REPEATED FIELD | (a1) |
| 8 | 0 | 1 | FIELD OTHER THAN REPEATED FIELD | (b2) |
| 9 | 0 | 1 | FIELD OTHER THAN REPEATED FIELD | (c2) |
| 10 | 0 | 1 | FIELD OTHER THAN REPEATED FIELD | (c2) |
| 11 | 1 | 0 | REPEATED FIELD | (a2) |
| 12 | 0 | 1 | FIELD OTHER THAN REPEATED FIELD | (b2) |
| ⋮ | ⋮ | ⋮ | ⋮ | ⋮ |

| MOVEMENT DETERMINING FLAG | THRESHOLD VALUE |
|---|---|
| 0 OR 1 | a1  b1  c1 |
|  | a2  b2  c2 |

FIG.5

| FIELD | LARGE BIAS FLAG | SMALL BIAS FLAG | DETERMINATION RESULT |
|---|---|---|---|
| 1 | 0 | 1 | FIELD OTHER THAN REPEATED FIELD |
| 2 | 1 | 0 | REPEATED FIELD |
| 3 | 0 | 1 | FIELD OTHER THAN REPEATED FIELD |
| 4 | 0 | 1 | FIELD OTHER THAN REPEATED FIELD |
| 5 | 0 | 1 | FIELD OTHER THAN REPEATED FIELD |
| 6 | 0 | 1 | FIELD OTHER THAN REPEATED FIELD |
| 7 | 1 | 0 | REPEATED FIELD |
| 8 | 1 | 0 | FIELD OTHER THAN REPEATED FIELD |
| 9 | 0 | 1 | FIELD OTHER THAN REPEATED FIELD |
| 10 | 0 | 1 | FIELD OTHER THAN REPEATED FIELD |
| ⋮ | ⋮ | ⋮ | ⋮ |

FIG.9
(PRIOR ART)

CINEMA IMAGE
- 24 FRAMES/SEC.
- PROGRESSIVE

2:3 PULLDOWN CONVERSION PROCESS

EVERY FIFTH FIELD IS A REPEAT OF IMAGE TWO FIELDS BEFORE

TELECINE IMAGE
- 60 FRAMES/SEC.
- INTERLACED

BROADCAST ON TV

TELECINE IMAGE
- 60 FRAMES/SEC.
- INTERLACED

2:3 PULLDOWN SEQUENCE DETECTION

REVERSE 2-3 CONVERSION PROCESS

DETECT ONE REPEATED FIELD IN FIVE FIELDS AND REVERT TO ORIGINAL PROGRESSIVE IMAGE

PROGRESSIVE IMAGE
- 24 FRAMES/SEC.
- PROGRESSIVE

METHOD, SYSTEM AND COMPUTER-READABLE MEDIUM FOR DETECTING PULLDOWN SEQUENCE FROM INPUT INTERLACED IMAGES DEVICE

BACKGROUND OF THE INVENTION

1. Field of the Invention

The present invention relates to a technique of detecting a pulldown sequence from input interlaced images.

2. Description of the Related Art

A progressive scanning display such as a liquid crystal display (LCD) or a plasma display panel (PDP) is increasingly used in a television or a personal computer instead of a commonly used cathode ray tube.

In a progressive method, which is widely used in the progressive scanning display mentioned earlier, all the lines (scan lines) that form a frame are sequentially drawn, thus enabling to display an image with less flickering. For example, the progressive method of 24 frames per second (fps) is used in a cinema image such as a movie.

In a method called interlaced method, a field that is a convergence of odd lines and a field that is a convergence of even lines are alternately drawn. For example, a national television standard committee (NTSC) method which is an interlaced method of 30 fps (60 fields) is used in a television broadcast.

In a television which includes the progressive scanning display mentioned earlier, an interlace to progressive (IP) conversion process is carried out to convert an image of the interlaced method into an image of the progressive method. Thus, the image of the interlaced method (an interlaced image) such as the image in the television broadcast is displayed with a high image quality.

However, the interlaced image includes two types of images, an original image of the interlaced method and an image that is converted from the cinema image etc. For example, for carrying out the television broadcast from the 24 fps cinema image, the television, which includes the progressive scanning display, receives an image (a telecine image) converted to the 30 fps (60 fields) interlaced image. The received telecine image is IP-converted into the progressive image and displayed.

In a process called 2:3 pulldown process, the progressive image such as the 24 fps cinema image is converted into the 30 fps (60 fields) interlaced image. In a process called 2:3 pulldown sequence detection, the interlaced image subjected to the 2:3 pulldown process is reversely converted (IP-converted) into the original progressive image.

In the 2:3 pulldown process, for converting the 24 frame progressive image into the 30 frame (60 fields) interlaced image, a field before two fields is repeated once in a five field cycle (repeated field) to realize the conversion.

In the 2:3 pulldown sequence detection, by detecting a regularity of the repeated field, the interlaced image subjected to the 2:3 pulldown process is IP-converted into the original progressive image.

Thus, a detection of the repeated field in the 2:3 pulldown sequence detection is extremely significant for generating the high quality image using the IP conversion process. Due to this, various technologies have been disclosed for accurately detecting the repeated field.

For example, in a technology disclosed in Japanese Patent Application Laid-open No. 2003-179884, a frame difference and a field difference in a small area are compared to predetermined threshold values to detect the repeated field and to carry out the IP conversion process (2:3 pulldown sequence detection).

Further, in a technology disclosed in Japanese Patent Application Laid-open No. H3-58677, a movement is detected from a difference absolute value by using the frame difference of a current field and a field before two fields, the difference absolute value is compared to the predetermined threshold values, and the repeated field is detected to carry out the IP conversion process (the 2:3 pulldown sequence detection).

A comparison of the frame difference (a feature quantity) and the threshold values is explained in detail. As shown in FIG. 9, generally, when using the 2:3 pulldown process to convert the 24 frame cinema image into the telecine image of 60 fields, two fields or three fields are alternately created from a single frame.

In other words, fields 1 and 2 are created from a frame A. Fields 3, 4, and 5 are created from a frame B. Similarly, two fields are created from a frame C and three fields are created from a frame D. A field before two fields is substituted as the repeated field once in the five field cycle. In other words, fields, which are the same as the field 5 and the field 8, are substituted respectively in the five field cycles in a total of ten fields to realize the conversion.

Next, the repeated field is detected to reversely convert the 60 fps interlaced image (the telecine image) into the 24 fps progressive image. To be specific, each field is compared with the field two fields before the field, and the difference absolute value of the feature quantity (the field difference) that is a comparison result for each of the pixels constituting the field is plotted in a chart shown in FIG. 10. As shown in FIG. 10, the difference absolute value of the feature quantity (the field difference) is smaller for the fields created from the same frame and a correlation between the fields is larger. The difference absolute value of the feature quantity is greater for the fields created from different frames, and the correlation between the fields is smaller. Thus, if the difference absolute values between a field and the repeated field of the field are plotted in a distribution chart as shown in FIG. 10, then the plotted difference absolute values are distributed in a range equal to or smaller than a threshold value a.

As for the fields other than repeated fields, comparing a field with the field two fields before is to compare fields derived from different frames. Thus, since the feature quantity is larger and the correlation is smaller for such the fields, the difference absolute values between fields from different frames are distributed in a range less than or equal to a threshold value b or in a range greater than or equal to a threshold value c.

In the 2:3 pulldown sequence detection, the field which includes the feature quantity distributed in the range that is less than or equal to the threshold value a is determined as the repeated field. Further, the field which includes the feature quantity distributed in the range that is less than or equal to the threshold value b and greater than or equal to the threshold value c is determined as a field other than the repeated field, thus detecting the regularity of occurrence of the repeated field once in the five field cycle.

In conventional technologies that are mentioned earlier, the frame difference or the field difference (the feature quantity) is calculated to calculate the movement of the image and a calculation result is compared to the fixed threshold values to detect the repeated field. However, in an image that includes less amount of movement or an image that includes only local movement (for example, a blinking movement), the difference absolute value of the feature quantity (the field difference) decreases and the correlation between the fields increases even for a field other than the repeated field. Due to this, a field other than the repeated field is also determined as the repeated field, thus resulting in a detection error or a detection failure. Moreover, the regularity of occurrence of the repeated field once in the five field cycle cannot be detected accurately and the 2:3 pulldown sequence detection cannot be carried out precisely.

SUMMARY OF THE INVENTION

It is an object of the present invention to at least partially solve the problems in the conventional technology.

According to an aspect of the invention, there is provided a method of detecting a pulldown sequence from input interlaced images. The method comprises comparing pixels of each field, as a first field, that forms the interlaced image with pixels of a third field one frame before the first field; calculating a difference absolute value using a frame difference by the comparison, using a plurality of threshold values to determine a distribution bias of the difference absolute values; and detecting, from the interlaced image, a repeated field candidate that occurs once in a five field cycle and fields other than the repeated field. The method further comprises based on a regularity of repeated field occurrence, determining whether each of the repeated field candidates is the repeated field or not; and if one of the repeated field candidates is not determined to be the repeated field, controlling the threshold values.

According to another aspect of the invention, there is provided a pulldown sequence detecting system that detects a pulldown sequence from input interlaced images. The pulldown sequence detecting system comprises a repeated field candidate detecting unit that compares pixels of each field, as a first field, that forms the interlaced image with pixels of a third field one frame before the first field, calculates a difference absolute value using a frame difference by the comparison, uses a plurality of threshold values to determine a distribution bias of the difference absolute values, and detects, from the interlaced image, a repeated field candidate that occurs once in a five field cycle and fields other than the repeated field; a repeated field determining unit that determines, based on a regularity of repeated field occurrence, whether each of the repeated field candidates detected by the repeated field candidate detecting unit is the repeated field or not; and a threshold value controller, responsive to a determination by the repeated field determining unit that one of the repeat field candidates is not the repeated field, for controlling the threshold values.

According to further aspect of the invention, there is provided a computer-readable medium storing computer instructions for instructing a computer system to detecting a pulldown sequence from input interlaced images. The computer instructions comprises comparing pixels of each field, as a first field, that forms the interlaced image with pixels of a third field one frame before the first field; calculating a difference absolute value using a frame difference by the comparison; using a plurality of threshold values to determine a distribution bias of the difference absolute values; and detecting, from the interlaced image, a repeated field candidate that occurs once in a five field cycle and fields other than the repeated field. The computer instructions further comprises based on a regularity of repeated field occurrence, determining whether each of the repeated field candidates is the repeated field or not; and if one of the repeated field candidates is not determined to be the repeated field, controlling the threshold values.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 2A and 2B are diagrams for explaining the overview and the salient feature of the 2:3 pulldown sequence detecting system according to the first embodiment;

FIG. 5 is a schematic of a structure of data that is stored in a history data table;

FIG. 9 is a schematic for explaining a conventional technology; and

DETAILED DESCRIPTION OF THE PREFERRED EMBODIMENTS

Figures 1A, 1B:
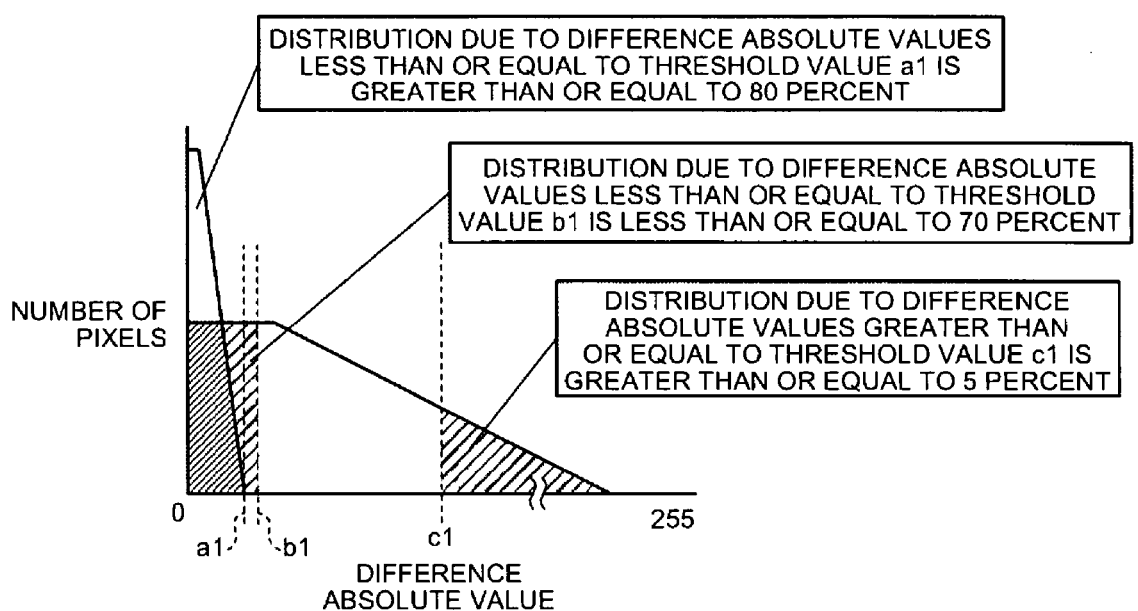
FIGS. 1A and 1B are diagrams for explaining an overview and salient features of a 2:3 pulldown sequence detecting system according to a first embodiment of the present invention.

Exemplary embodiments of the connection controller according to the present invention are explained below with reference to the accompanying drawings. A main terminology used in the embodiments, an overview and a salient feature of a 2:3 pulldown sequence detecting system according to a first embodiment of the present invention, a structure and a process sequence of the 2:3 pulldown sequence detecting system according to the first embodiment, and effects of the first embodiment are explained sequentially. Other embodiments are explained in the end.

The main terminology used in the first embodiment is explained first. "Interlaced image" indicates an image in which a field that is a convergence of odd lines and a field that is a convergence of even lines are alternately drawn. For example, a national television standard committee (NTSC) method which is an interlaced method of 30 frames (60 fields) per second (fps) is used in a television broadcast.

Further, "progressive image" indicates a progressive scanning display such as a liquid crystal display (LCD) or a plasma display panel (PDP). In a progressive method that is widely used in the progressive scanning display, all the lines (scan lines) that form a frame are sequentially drawn, thus enabling to display an image with less flickering. For example, the progressive method of 24 fps is used in a cinema image such as a movie.

"Interlace to progressive (IP) conversion process" indicates a process in which a television that includes the progressive scanning display converts an image of the interlaced method into an image of the progressive method. Thus, the image of the interlaced method (interlaced image) such as the image in the television broadcast is displayed with a high image quality. In a process called 2:3 pulldown conversion process (2:3 pulldown process), an image before two fields is repeated once (repeated field) in a five field cycle, thus converting the 24 fps progressive image into the 30 fps (60 fields) interlaced image. The image which is converted by subjecting to the 2:3 pulldown process is called a telecine image.

The "2:3 pulldown sequence detecting system" indicates a system in which the interlaced image subjected to the 2:3 pulldown conversion process is reversely 2-3 converted (IP-converted) into the original progressive image. To be specific using the example mentioned earlier, when reversely 2-3 converting into the original progressive image, the telecine image that is converted from the 24 fps progressive image into the 30 fps (60 fields) interlaced image by subjecting the telecine image to the 2:3 pulldown conversion process, the 2:3 pulldown sequence detecting system detects the repeated field that is inserted during the 2:3 pulldown conversion process. The repeated field is the field in which the image before two fields is repeated once in the five field cycle. Detecting the repeated fields is specifically called 2:3 pulldown sequence detection.

The 2:3 pulldown sequence detecting system combines two fields from all the fields other than the detected repeated field to form a single frame. Due to this, the telecine image which is converted from the 24 fps progressive image into the 30 fps (60 fields) interlaced image using the 2:3 pulldown conversion process is converted into the original progressive image. Thus, the image which is converted from the high quality progressive image into the interlaced image of deteriorated image quality can be converted into the original high quality image.

<Overview and Features>

The overview and the salient feature of the 2:3 pulldown sequence detecting system according to a first embodiment of the invention are explained next with reference to FIGS. 1 and 2. FIGS. 1 and 2 are schematics for explaining the overview and the salient features of the 2:3 pulldown sequence detecting system according to the first embodiment.

The 2:3 pulldown sequence detecting system according to the first embodiment includes a history data table that establishes and stores therein a correspondence between each input field and a determination result of whether each input field is the repeated field. To explain specifically using an example, the history data table stores therein "1, 1, 0, repeated field" as respective entries for "field" that indicates a determined field, "large bias flag" that stores therein 1 when the determined field is the repeated field, "small bias flag" that stores therein 1 when the determined field is a field other than the repeated field, and "determination result" that indicates a determination result (see FIG. 5).

Further, the 2:3 pulldown sequence detecting system includes a threshold value table that stores therein threshold values that are controlled. To explain specifically using an example, the threshold value table stores therein "0, a1, b1, and c1" as respective entries for "movement determining flag" that indicates whether a movement is small or large, and "threshold values" that indicates the threshold values. Further, "threshold values" and "movement determining flag" need not always be stored by establishing a correspondence.

Thus, the 2:3 pulldown sequence detecting system according to the first embodiment detects a 2:3 pulldown sequence from the input interlaced image. Especially, enabling to precisely detect the pulldown sequence is the salient feature of the 2:3 pulldown sequence detecting system according to the first embodiment.

The salient feature is explained in detail. As shown in FIG. 1B, the 2:3 pulldown sequence detecting system compares pixels of each field (a first field) that forms the interlaced images with corresponding pixels of a field (a third field) one frame before the field (the first field) to calculate the absolute value of the difference between each pixel of the first field and a corresponding pixel of the third field, which absolute value is referred to as "the difference absolute value, and uses the multiple threshold values to determine a distribution bias of the difference absolute values for each field. Next, the 2:3 pulldown sequence detecting system detects from the interlaced image, a repeated field candidate that occurs once in the five field cycle and the fields other than the repeated field. Specifically, for each pixel of each of all the fields constituting the interlaced images, the 2:3 pulldown sequence detecting system calculates the difference absolute value, which can range from 0 to 255 (corresponding to 256 grayscales) in this example, and plots the difference absolute values in a graph or a histogram as shown in FIG. 1B. Next, in the plotted graph, the 2:3 pulldown sequence detecting system uses the threshold values that are stored in the threshold value table. As shown in the first record of the history data table of FIG. 1A, if more than 80% of all the pixels of a field have difference absolute values less than or equal to the threshold value a1, then the 2:3 pulldown sequence detecting system stores "1" in "large bias flag." and "0" in "small bias flag" in the history data table as data that indicates a repeated field candidate.

As shown in the second record of the history data table of FIG. 1A, if less than 70% of all the pixels of a field have difference absolute values less than or equal to the threshold value b1 or if more than 5% of all the pixels of a field have difference absolute values larger than or equal to the threshold value c1, then the 2:3 pulldown sequence detecting system stores "0" in "large bias flag" and "1" in "small bias flag" of the history data table. Thus, as shown in FIG. 1A, the 2:3 pulldown sequence detecting system determines, for each field of the input images, whether the field is the repeated field candidate or a field other than the repeated field, and stores the determination result in the history data table.

Based on a regularity of occurrence of the repeated field, the 2:3 pulldown sequence detecting system detects, from the detected repeated field candidate, whether the repeated field candidate is the repeated field. To specifically explain using the example mentioned earlier, upon storing the determination results for each field of the input images in the history data table, the 2:3 pulldown sequence detecting system determines whether the repeated field candidate is detected at an interval of once in the five field cycle for a prior stipulated field interval (for example, for every 20 fields etc.). If the repeated field candidate which is stored in the history data table as "large bias flag=1, small bias flag=0" is detected at the interval of once in the five field cycle, the 2:3 pulldown sequence detecting system determines that the repeated field candidate is the repeated field, and stores "repeated field" in "determination result" of the history data table.

If the repeated field candidate which is stored in the history data table as "large bias flag=1, small bias flag=0" is not detected at the interval of once in the five field cycle, the 2:3 pulldown sequence detecting system determines that the repeated field candidate is a field other than the repeated field instead of determining that the repeated field candidate is the repeated field and stores "field other than repeated field" in "determination result". To explain specifically using an example, as shown in the seventh line of FIG. 2B, because the repeated field candidate is detected at the interval of once in the five field cycle, the repeated field candidate generally includes "large bias flag=0 and small bias flag=1". A field (field number 7) which is determined as "field other than repeated field" includes "large bias flag=1, small bias flag=0". Based on the fact that generally the repeated field candidate is detected at the interval of once in the five field cycle, the 2:3 pulldown sequence detecting system determines that the field (field number 7) is "field other than repeated field" instead of "repeated field".

If a repeated field candidate is determined to be not the repeated field, the 2:3 pulldown sequence detecting system controls the multiple threshold values. To specifically explain using the example mentioned earlier, as shown in the seventh line (field number 7) of FIG. 2B, regardless of "large bias flag=1, small bias flag=0", if the field is determined as "field other than repeated field" instead of "repeated field", the 2:3 pulldown sequence detecting system refers, as shown in FIG. 2A, to the threshold value table and changes the threshold values a1, b1 and c1 to smaller threshold values a2, b2 and c2.

Next, the 2:3 pulldown sequence detecting system uses the modified threshold values to determine whether each field of the input images (field number 8 or more) is the repeated field candidate. For each input field, if the frame difference distribution in which the difference absolute values are less than or equal to the threshold value a2 is greater than or equal to 80 percent for example, the 2:3 pulldown sequence detecting system stores the field in the history data table as the repeated field candidate. If the frame difference distribution in which the difference absolute values are less than or equal to the threshold value b2 is less than or equal to 70 percent or if the frame difference distribution in which the difference absolute values are greater than or equal to the threshold value c2 is greater than or equal to 5 percent, the 2:3 pulldown sequence detecting system stores the field in the history data table as a field other than the repeated field. If the repeated field candidate is detected at the interval of once in the five field cycle, the 2:3 pulldown sequence detecting system determines that the repeated field candidate is the repeated field.

Thus, the 2:3 pulldown sequence detecting system according to the first embodiment can accurately detect the regularity of occurrence of the repeated field once in the five field cycle, thereby enabling to prevent a detection error or a detection failure. Thus, the 2:3 pulldown sequence can be precisely detected by using the salient feature mentioned earlier.

Figures 3, 4:
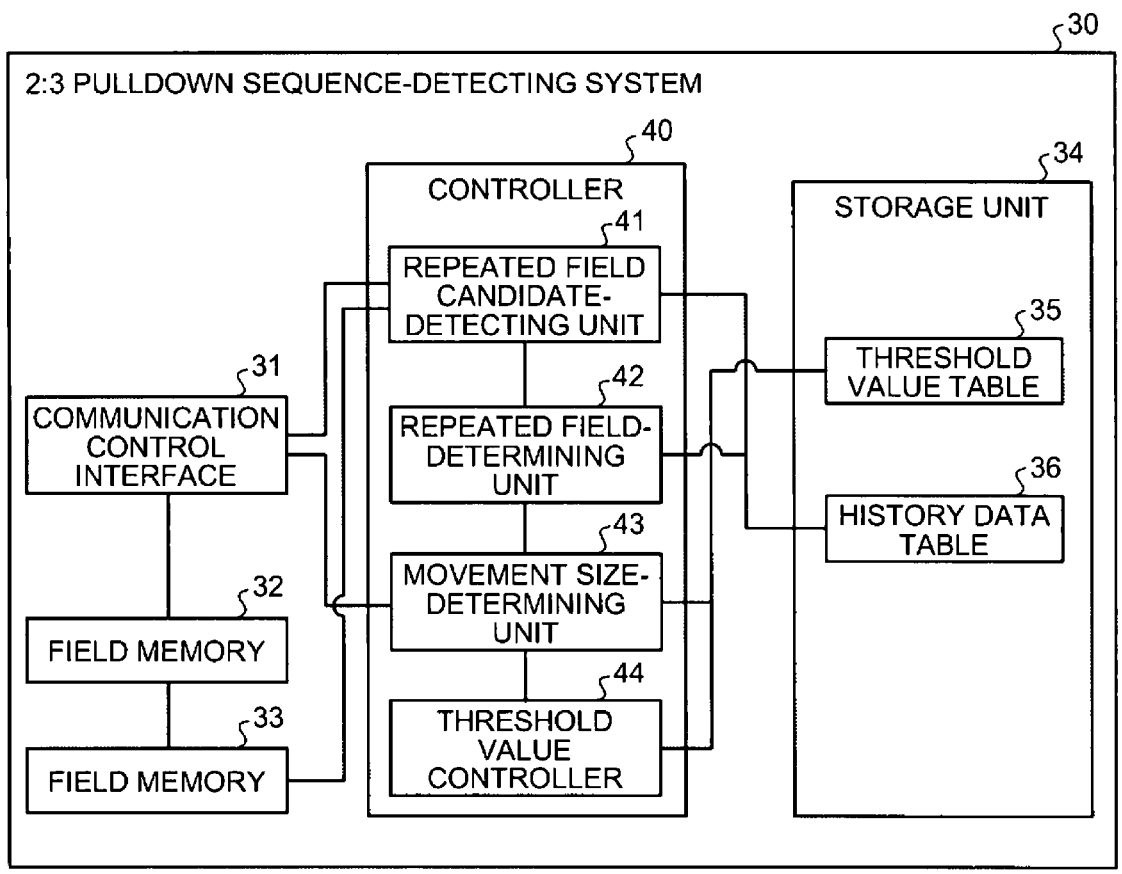
FIG. 3 is a block diagram of the 2:3 pulldown sequence detecting system according to the first embodiment.
FIG. 4 is a schematic of a structure of data that is stored in a threshold value table.

The structure of the 2:3 pulldown sequence detecting system shown in FIGS. 1 and 2 is explained next with reference to FIGS. 3 to 5. FIG. 3 is a block diagram of the 2:3 pulldown sequence detecting system according to the first embodiment. FIG. 4 is a schematic of a structure of data that is stored in the threshold value table. FIG. 5 is a schematic of a structure of data that is stored in the history data table. As shown in FIG. 3, a 2:3 pulldown sequence detecting system 30 includes a communication control interface 31, field memories 32 and 33, a storage unit 34, and a controller 40.

The communication control interface 31 controls communication related to various types of data that is transacted between the 2:3 pulldown sequence detecting system 30 and various devices that are connected to the 2:3 pulldown sequence detecting system 30. To be specific, for example, the communication control interface 31 receives as input signals, an image such as a moving image from an external device such as a television broadcasting station. Further, the communication control interface 31 transmits to the other devices, the image that is reversely 2:3 converted into the original progressive image by the 2:3 pulldown sequence detecting system 30 from the telecine image that is subjected to the 2:3 pulldown conversion process.

The field memories 32 and 33 temporarily store therein the image before two fields. To specifically explain using an example, if an input field is denoted by F (t), the field memory 32 stores therein an image F (t−1) and the field memory 33 stores therein an image F (t−2).

The storage unit 34 stores therein data and programs that are necessary for various processes that are carried out by the controller 40. Especially, the storage unit 34 includes a threshold value table 35 and a history data table 36 that are closely related to the present invention. The threshold value table 35 stores therein the threshold values, which determine the distribution bias of the difference absolute value of the feature quantity from the number of pixels that are compared between each field that forms the input images. To explain specifically using an example, as shown in FIG. 4, the threshold value table 35 stores therein "0 or 1, a1, b1, c1" as the respective values corresponding to "movement determining flag" that indicates whether the movement is large or small, and "threshold values" that indicates the threshold values.

The history data table 36 stores therein each input field by establishing a correspondence between the input field and the determination result of whether the input field is the repeated field. Specifically, as shown in FIG. 5, the history data table 36 stores in each record or row "field" that indicates the field number given to the field, "large bias flag" that stores therein 1 when the field is the repeated field, "small bias flag" that stores therein 1 when the field is a field other than the repeated field, and "determination result" that indicates the determination result. Thus, the history data table 36 stores, for example, "1, 0, 1, field other than repeated field" in a record for the first field, "2, 1, 0 repeated field" in a record for the second field and so on.

The controller 40 includes an internal memory for storing programs that regulate various process sequences and the necessary data. Especially, the controller 40 further includes a repeated field candidate detecting unit 41, a repeated field determining unit 42, a movement size determining unit 43, and a threshold value controller 44 that are closely related to the present invention. The controller 40 uses the repeated field candidate detecting unit 41, the repeated field determining unit 42, the movement size determining unit 43, and the threshold value controller 44 to execute various processes.

The repeated field candidate detecting unit 41 calculates the difference absolute value between each pixel of the first field that forms the input interlaced images and a corresponding pixel of the third field one frame before the first field, uses the multiple threshold values to determine the distribution bias of the difference absolute values, and detects the repeated field candidates from the interlaced images. In this case, the repeated field candidate detecting unit 41 compares a target field with a field one frame before the target field: e.g., the first field with the third field, the second field with the fourth field, the third field with the fifth field, and so on. Then, the repeated field candidate detecting unit 41 plots the difference absolute values for the field in the difference absolute value histogram as shown in FIG. 1B. Next, the repeated field candidate detecting unit 41 uses in the difference absolute value histogram, the threshold values that are stored in the threshold value table 35. If the frame difference distribution in which the difference absolute values are less than or equal to the threshold value a1 is greater than or equal to 80 percent, the repeated field candidate detecting unit 41 stores the field as the repeated field candidate in the history data table 36 by storing "1" in "large bias flag" and "0" in "small bias flag".

If the frame difference distribution in which the difference absolute values are less than or equal to the threshold value b1 is less than or equal to 70 percent or if the frame difference distribution in which the difference absolute values are greater than or equal to the threshold value c1 is greater than or equal to 5 percent, then the repeated field candidate detecting unit 41 stores "0" in "large bias flag" and "1" in "small bias flag" in the history data table 36. Thus, the repeated field candidate detecting unit 41 determines, for each field of the input images whether the field is the repeated field candidate or a field other than the repeated field, and stores the appropriate values in "large bias flag, small bias flag" of the history data table 36.

If the threshold values are modified from "a1, b1, c1" to "a2, b2, c2" by the threshold value controller 44, the repeated field candidate detecting unit 41 uses the modified threshold values "a2, b2, c2" to determine, for each input field, whether the field is the repeated field or a field other than the repeated field, and stores the appropriate values in the history data table 36.

Based on the regularity of occurrence of the repeated field, the repeated field determining unit 42 determines, from the repeated field candidate that is detected by the repeated field candidate detecting unit 41, whether the repeated field candidate is the repeated field. To specifically explain using the example mentioned earlier, upon the repeated field candidate detecting unit 41 storing the determination result for each field of the input images in the history data table 36, the repeated field determining unit 42 determines whether the repeated field candidate is detected at the interval of once in the five field cycle for the prior stipulated field interval (for example, for every 20 fields etc.). If the repeated field candidate which is stored in the history data table 36 as "large bias flag=1, small bias flag=0" is detected at the interval of once in the five field cycle, the repeated field determining unit 42 determines that the repeated field candidate is the repeated field, and stores "repeated field" in "determination result" of the history data table 36.

If the repeated field candidate which is stored in the history data table 36 as "large bias flag=1, small bias flag=0" is not detected at the interval of once in the five field cycle, the repeated field determining unit 42 determines that the repeated field candidate is a field other than the repeated field instead of determining that the repeated field candidate is the repeated field, and stores "field other than repeated field" in "determination result" of the history data table 36.

To specifically explain with reference to FIG. 5, because the repeated field candidate which includes "large bias flag=1, small bias flag=0" (the second line and the seventh line of FIG. 5) is detected at the interval of once in the five field cycle, the repeated field determining unit 42 determines that the field in the second line and the seventh line of FIG. 5 is the real repeated field. Although the field in the eighth line of FIG. 5 is also determined as the repeated field candidate that includes "large bias flag=1, small bias flag=0", because the field does not match with the regularity of detection at the interval of once in the five field cycle, the repeated field determining unit 42 determines that the field in the eighth line is a field other than the repeated field.

The movement size determining unit 43 compares the pixels of each field to the pixels of the third field that is one frame before each field to calculate the difference absolute value. If the difference absolute value exceeds a predetermined threshold value, the movement size determining unit 43 determines that the field includes movement, and if the difference absolute value is less than the predetermined threshold value, the movement size determining unit 43 determines that the field includes less amount of movement. To specifically explain using an example, the movement size determining unit 43 compares the pixels of each field to the pixels of the third field that is one frame before each field to calculate the frame difference. If the frame difference exceeds the threshold value (for example, 25), the movement size determining unit 43 determines that the field includes movement, and sets "movement determining flag" to "1". If the frame difference is less than the threshold value, the movement size determining unit 43 determines that the field includes less amount of movement, sets "movement determining flag" to "0", and notifies the result to the threshold value controller 44 that is explained later.

If a repeated field candidate is not determined to be the repeated field by the repeated field determining unit 42 and the movement size determining unit 43 determines that the field includes less amount of movement, the threshold value controller 44 controls the multiple threshold values. To specifically explain using the example mentioned earlier, as shown in the eighth line of FIG. 5, if "large bias flag=1, small bias flag=0" is stored in the history data table 36, the field that needs to be determined as "repeated field" is determined as "field other than repeated field", and the movement size determining unit 43 determines that the field includes less amount of movement (movement determining flag=0), the threshold value controller 44 refers to the threshold value table 35 and changes the threshold values a1, b1 and c1 to smaller threshold values a2, b2 and c2 (see FIG. 2B).

Further, regardless of a result by the movement size determining unit 43, if the repeated field candidate is not determined as the real repeated field by the repeated field determining unit 42, the threshold value controller 44 can also control the multiple threshold values such that an interval of the multiple threshold values is reduced. To specifically explain using the example mentioned earlier, if "large bias flag=1, small bias flag=0" is stored in the history data table 36 and the field that needs to be determined as "repeated field" is determined as "field other than repeated field", the threshold value controller 44 refers to the threshold value table 35 and modifies the threshold values from "a1, b1, c1" to "a2, b2, c2" to reduce the threshold values (see FIG. 2B).

Figure 6:
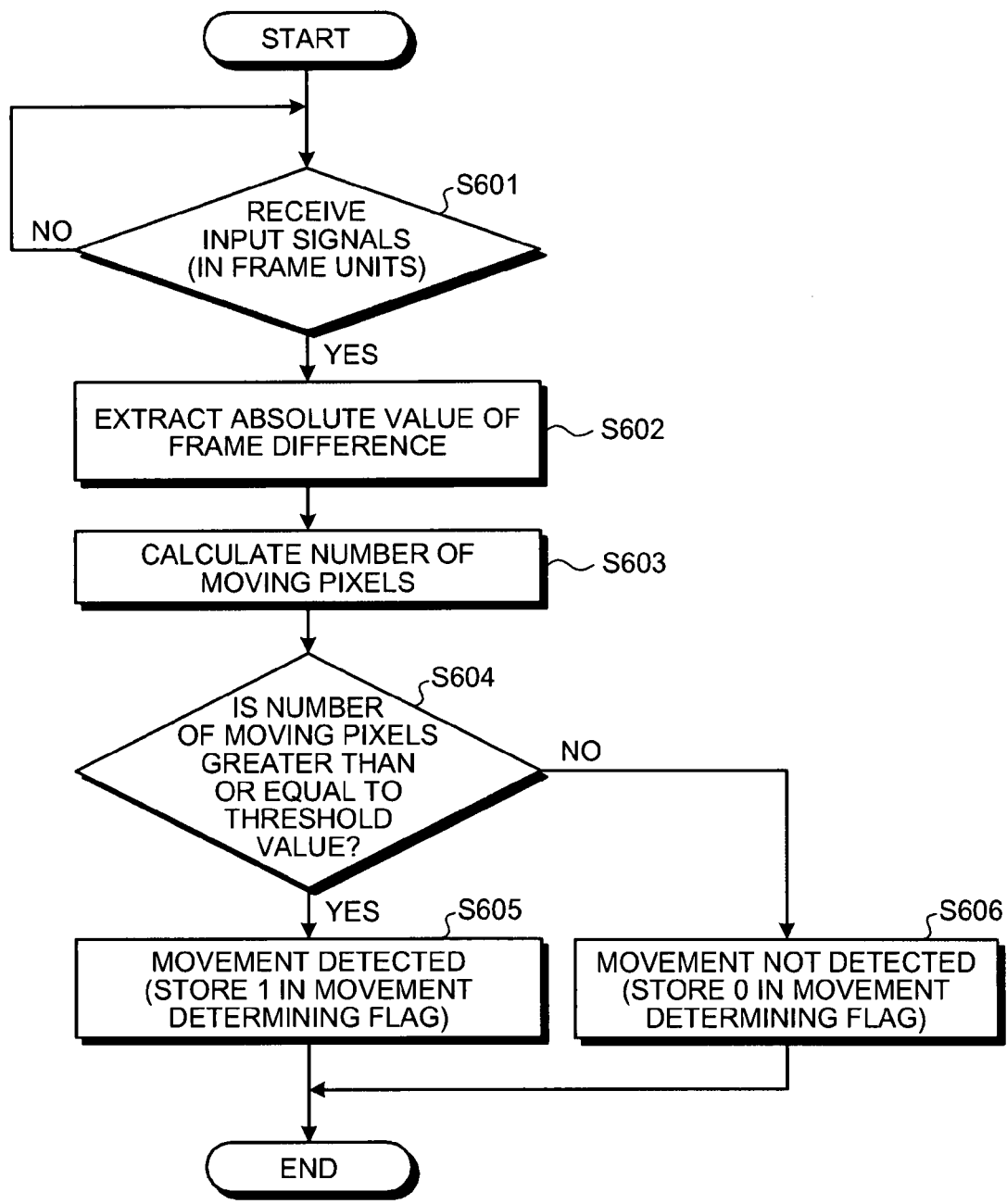
FIG. 6 is a flowchart of a movement size determining process performed by the 2:3 pulldown sequence detecting system according to the first embodiment.
Figure 7:
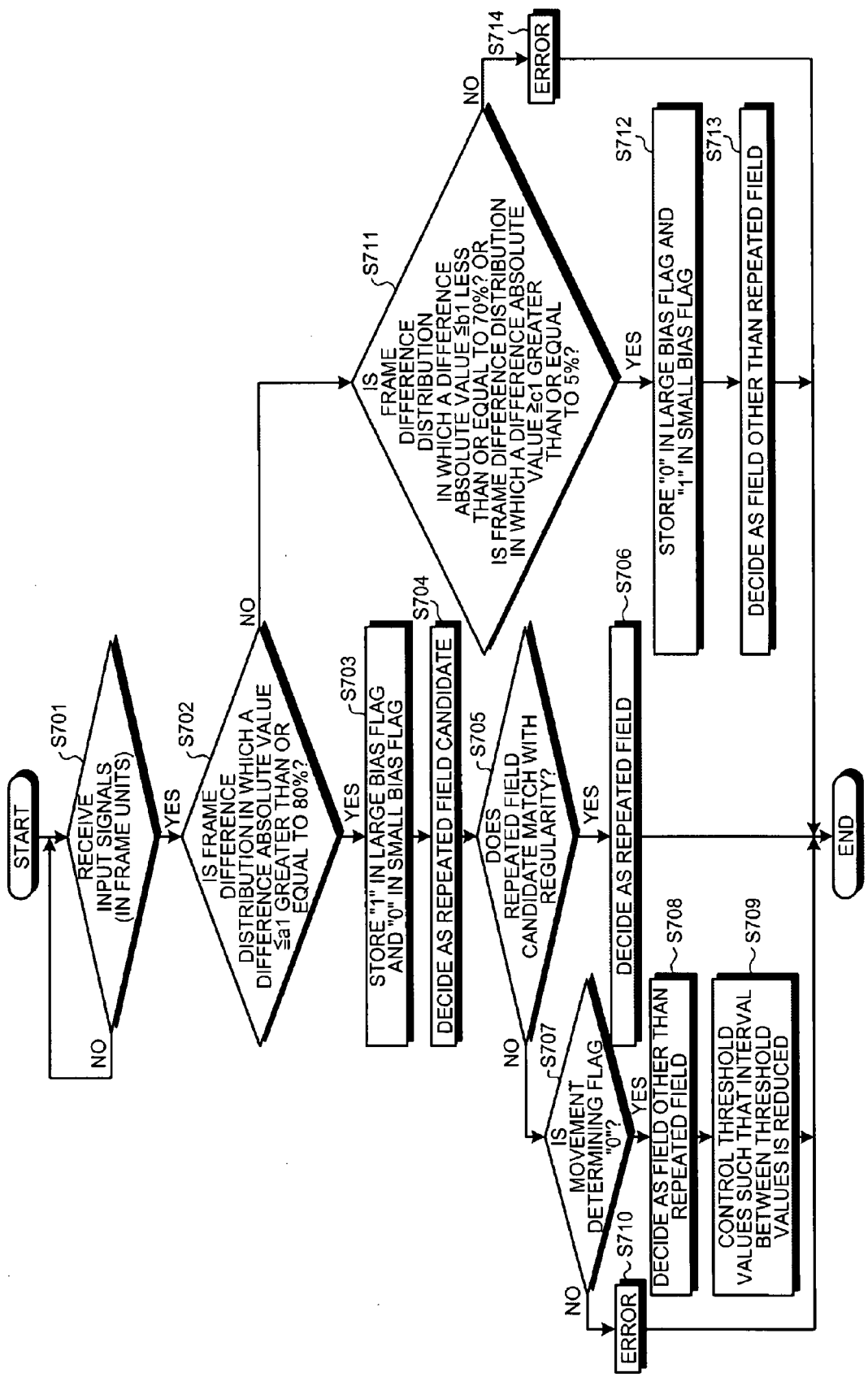
FIG. 7 is a flowchart of a repeated field determining process performed by the 2:3 pulldown sequence detecting system according to the first embodiment.

A process performed by the 2:3 pulldown sequence detecting system is explained with reference to FIGS. 6 and 7. FIG. 6 is a flowchart of a movement size determining process performed by the 2:3 pulldown sequence detecting system according to the first embodiment. FIG. 7 is a flowchart of a repeated field determining process performed by the 2:3 pulldown sequence detecting system according to the first embodiment.

As shown in FIG. 6, upon receiving the input signals in frame units (Yes at step S601), the movement size determining unit 43 of the 2:3 pulldown sequence detecting system 30 extracts an absolute value of the frame difference between the input frames (step S602).

Next, the movement size determining unit 43 calculates the number of moving pixels from the absolute difference values for the fields (step S603) and determines whether the number of moving pixels is greater than or equal to the threshold value (step S604).

If the number of moving pixels is greater than or equal to the threshold value (Yes at step S604), the movement size determining unit 43 determines "movement detected" and stores "1" in "movement determining flag" (step S605). If the number of moving pixels is less than the threshold value (No at step S604), the movement size determining unit 43 determines "movement not detected" and stores "0" in "movement determining flag" (step S606).

As shown in FIG. 7, upon receiving the input signals in the frame units (Yes at step S701), the repeated field candidate detecting unit 41 of the 2:3 pulldown sequence detecting system 30 compares each pixel of each field (the first field) that forms the interlaced images with a corresponding pixel of the third field one frame before the first frame to calculate the difference absolute value for each pixel of each field and uses the multiple threshold values to determine the distribution bias of the difference absolute values (step S702). The repeated field determining unit 42 can also compare any fields instead of comparing the first field and the third field.

If the frame difference distribution in which the difference absolute values are less than or equal to the threshold value a1 is greater than or equal to 80 percent (Yes at step S702), the repeated field candidate detecting unit 41 stores "1" in "large bias flag" and "0" in "small bias flag" of the history data table 36 (step S703) and decides that the field is the repeated field candidate (step S704).

Next, based on the regularity of occurrence of the repeated field, the repeated field determining unit 42 determines, from the repeated field candidate that is detected by the repeated field candidate detecting unit 41, whether the field is the repeated field (step S705).

If the repeated field candidate matches with the regularity (Yes at step S705), the repeated field determining unit 42 decides that the repeated field candidate is the repeated field and stores "repeated field" in "determination result" of the history data table 36 (step S706).

If the repeated field candidate does not match with the regularity (No at step S705), the repeated field determining unit 42 determines whether the movement determining flag is "0" (step S707).

If the movement determining flag is "0", the repeated field determining unit 42 decides that the repeated field candidate is a field other than the repeated field, stores "field other than repeated field" in "determination result" of the history data table 36 (step S708), and the threshold value controller 44 controls the threshold values such that the interval of the threshold values that are used is reduced (step S709). If the movement determining flag is not "0" (for example, if the movement determining flag is "1"), the 2:3 pulldown sequence detecting system 30 returns an error and ends the repeated field determining process (step S710).

Returning to step S702, if the frame difference distribution in which the difference absolute values are less than or equal to the threshold value a1 is not greater than or equal to 80 percent (No at step S702), the repeated field candidate detecting unit 41 determines whether the frame difference distribution in which the difference absolute values are less than or equal to the threshold value b1 is less than or equal to 70 percent, or whether the frame difference distribution in which the difference absolute values are greater than or equal to the threshold value c1 is greater than or equal to 5 percent (step S711).

If the frame difference distribution in which the difference absolute values are less than or equal to the threshold value b1 is less than or equal to 70 percent, or if the frame difference distribution in which the difference absolute values are greater than or equal to the threshold value c1 is greater than or equal to 5 percent, the repeated field candidate detecting unit 41 stores "0" in "large bias flag" and "1" in "small bias flag" of the history data table 36 (step S712), and decides that the field is a field other than the repeated field (step S713).

If the frame difference distribution in which the difference absolute values are less than or equal to the threshold value b1 is not less than or equal to 70 percent, or if the frame difference distribution in which the difference absolute values are greater than or equal to the threshold value c1 is not greater than or equal to 5 percent, the 2:3 pulldown sequence detecting system 30 returns an error and ends the repeated field determining process (step S714).

According to the first embodiment, the 2:3 pulldown sequence detecting system compares the pixels of the first field that forms the interlaced image to the pixels of the third field that is one frame before each field to calculate the difference absolute value. The 2:3 pulldown sequence detecting system uses the multiple threshold values to determine the distribution bias of the difference absolute value and detects the repeated field candidate that occurs once in the five field cycle and fields other than the repeated field from the interlaced image. Next, based on the regularity of occurrence of the repeated field, the 2:3 pulldown sequence detecting system determines, from the detected repeated field candidate, whether the repeated field candidate is the repeated field. If a repeated field candidate is not determined to be the repeated field, the 2:3 pulldown sequence detecting system controls the multiple threshold values. Thus, the pulldown sequence can be precisely detected.

For example, if the image includes less amount of movement or only local movement (for example, a blinking movement), the difference of the feature quantity (the field difference) decreases and the correlation between the fields increases even for the fields other than the repeated field. Due to this, based on field data, a field other than the repeated field is likely to be determined as the repeated field. However, when carrying out the 2:3 pulldown sequence detection on such an image, the 2:3 pulldown sequence detecting system reduces the threshold values, thereby enabling to accurately detect a field other than the repeated field similarly when the difference of the feature quantity is large. Due to this, the repeated field and fields other than the repeated field can be accurately detected from the input interlaced image and the regularity of occurrence (once in the five field cycle) of the repeated field can be accurately detected. Thus, because a detection error or a detection failure can be prevented, the 2:3 pulldown sequence can be precisely detected.

Further, according to the first embodiment, the 2:3 pulldown sequence detecting system compares the pixels of each field to the pixels of the third field that is one frame before each field to calculate the difference absolute value. If the difference absolute value is greater than the predetermined threshold value, the 2:3 pulldown sequence detecting system determines that the field includes movement. If the difference absolute value is less than the predetermined threshold value, the 2:3 pulldown sequence detecting system determines that the field includes less amount of movement. If a field candidate other than the repeated field is determined as the repeated field and the field includes less amount of movement, the 2:3 pulldown sequence detecting system controls the multiple threshold values. Due to this, the pulldown sequence can be precisely detected.

For example, in addition to the field data, if a movement size is less, the 2:3 pulldown sequence detecting system can reduce the threshold values, thus enabling to determine whether the field is the repeated field by using a standard that is near a determination standard that is used to determine whether the field is the repeated field when the difference of the feature quantity is large. Thus, the pulldown sequence can be precisely detected.

Further, according to the first embodiment, the 2:3 pulldown sequence detecting system calculates the difference absolute value between the first field that forms the interlaced image and the third field that is one frame before the first field, uses the multiple threshold values to determine the distribution bias of the difference absolute value, and detects the repeated field candidate from the interlaced image. Due to this, when carrying out the 2:3 pulldown sequence detection, the repeated field that indicates the field before two fields and that is inserted once in the five field cycle can be accurately detected. Thus, the 2:3 pulldown sequence can be precisely detected.

The first embodiment of the present invention is explained. However, various modifications may be made other than the specific details and representative embodiments shown and described herein. Other embodiments are explained separately below as (1) resetting of the threshold values, (2) a system structure etc., and (3) a computer program.

For example, after controlling the threshold values to reduce the threshold values, the 2:3 pulldown sequence detecting system 30 can also revert to the original threshold values. To be specific, after modifying the threshold values from "a1, b1, c1" to "a2, b2, c2", if the repeated field is detected, the threshold value controller 44 reverts the threshold values "a2, b2, c2" after modification to the threshold values "a1, b1, c1" before modification. To specifically explain with reference to FIG. 2B, for the fields after the eighth line of FIG. 2B, the repeated field candidate detecting unit 41 modifies the threshold values from "a1, b1, c1" to "a2, b2, c2" when determining whether the field is the repeated field candidate. When the repeated field is detected normally in the eleventh line of FIG. 2B, the threshold value controller 44 reverts the threshold values "a2, b2, c2" after modification to the threshold values "a1, b1, c1" before modification. From the eleventh line onwards, the repeated field candidate detecting unit 41 uses the threshold values "a1, b1, c1" to determine whether the field is the repeated field candidate.

If the 2:3 pulldown sequence detecting system 30 continues to use the reduced threshold values, the field which is normally determined as a field other than the repeated field is likely to be erroneously determined as the repeated field. However, reverting to the original threshold values enables to prevent such an erroneous determination.

The constituent elements of the system illustrated are merely conceptual and may not necessarily physically resemble the structures shown in the drawings. For instance, the system need not necessarily have the structure that is illustrated. The system as a whole or in parts can be broken down or integrated (for example, integrating the repeated field candidate detecting unit 41 and the repeated field determining unit 42 etc.) either functionally or physically in accordance with the load or how the system is to be used. The process functions performed by the apparatus are entirely or partially realized by a central processing unit (CPU) or a computer program executed by the CPU or by a hardware using wired logic. The sequence of processes, the sequence of controls, specific names, and data including various parameters can be changed as required unless otherwise specified.

The processes which are explained in the embodiments mentioned earlier can also be realized by executing a prior formulated computer program using a computer system such as a personal computer, workstation etc. An example of the computer system, which executes the computer program that includes functions similar to the embodiments mentioned earlier, is explained below.

Figure 8:
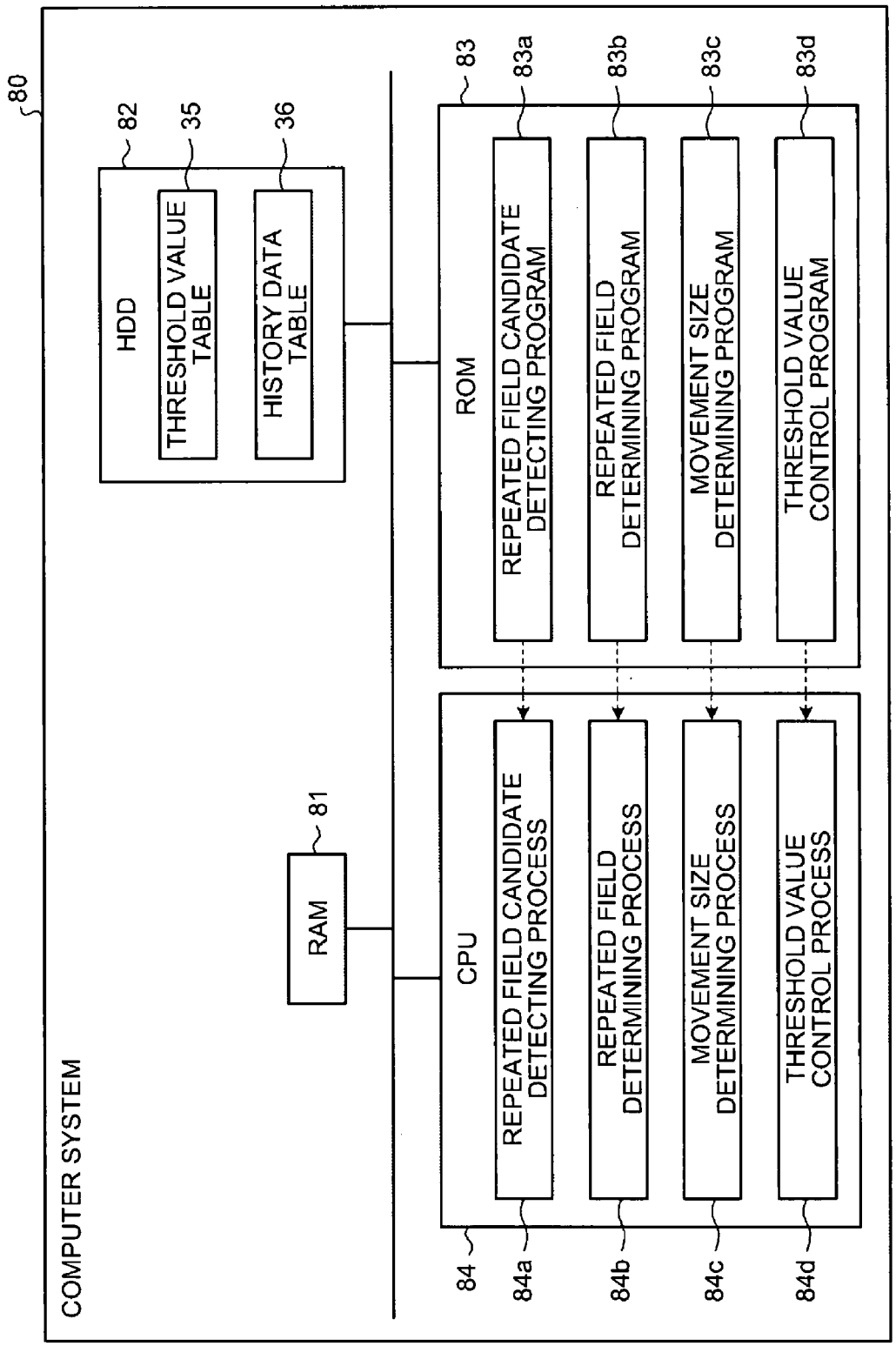
FIG. 8 is a block diagram of an example of a computer system that executes a 2:3 pulldown sequence detecting program.
Figure 10:
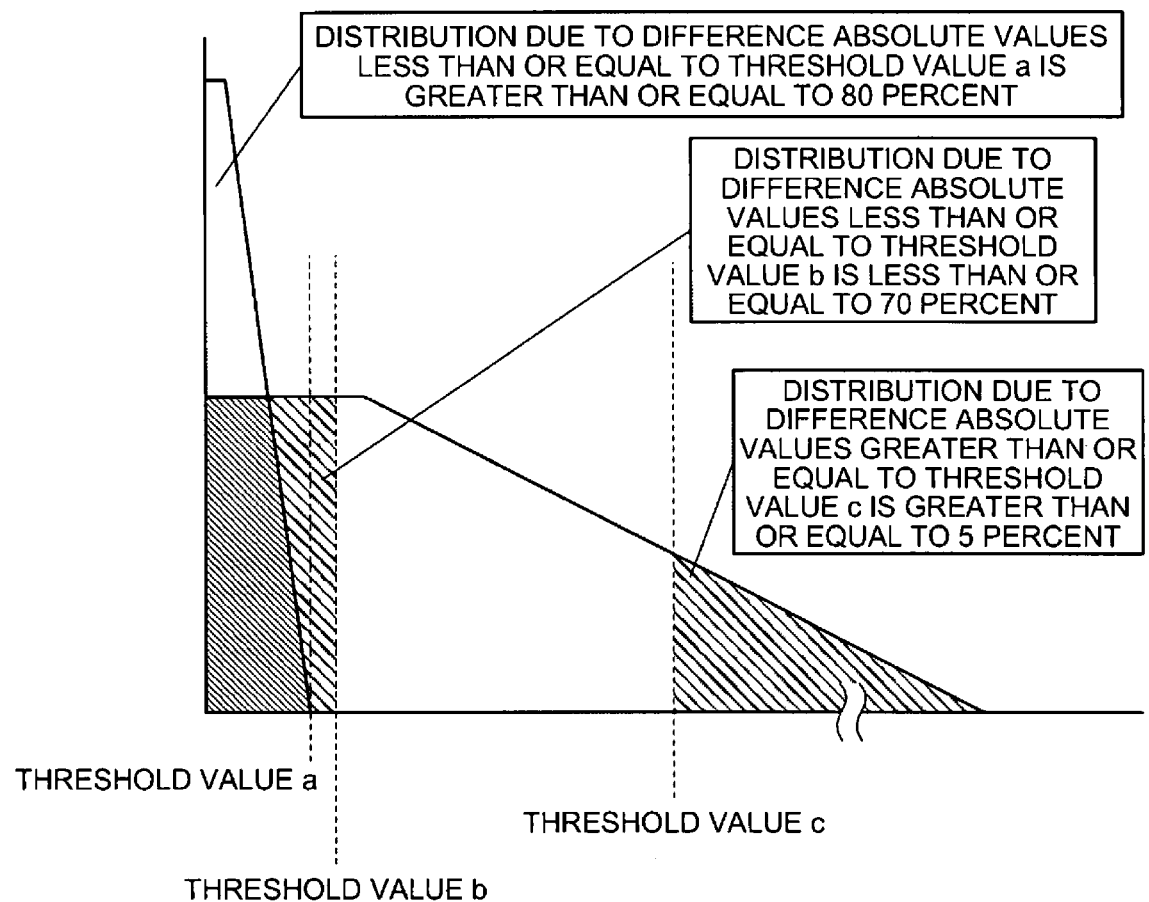
FIG. 10 is another schematic for explaining the conventional technology.

FIG. 8 is a block diagram of a computer system 80 that executes a 2:3 pulldown sequence detecting program. As shown in FIG. 8, the computer system 80 includes a random access memory (RAM) 81, a hard disk drive (HDD) 82, a read only memory (ROM) 83, and a CPU 84. The ROM 83 prior stores therein the computer program that exhibits the functions that are similar to the embodiments mentioned earlier. In other words, as shown in FIG. 8, the ROM 83 prior stores therein a repeated field candidate detecting program 83*a*, a repeated field determining program 83*b*, a movement size determining program 83*c*, and a threshold value control program 83*d*.

As shown in FIG. 8, the repeated field candidate detecting program 83*a*, the repeated field determining program 83*b*, the movement size determining program 83*c*, and the threshold value control program 83*d* are read by the CPU 84 and executed, thereby causing the repeated field candidate detecting program 83*a*, the repeated field determining program 83*b*, the movement size determining program 83*c*, and the threshold value control program 83*d* to function as a repeated field candidate detecting process 84*a*, a repeated field determining process 84*b*, a movement size determining process 84*c*, and a threshold value control process 84*d* respectively. The repeated field candidate detecting process 84*a* corresponds to the repeated field candidate detecting unit 41 that is shown in FIG. 2. Similarly, the repeated field determining process 84*b*, the movement size determining process 84*c*, and the threshold value control process 84*d* correspond respectively to the repeated field determining unit 42, the movement size determining unit 43, and the threshold value controller 44.

The HDD 82 stores therein the above-described threshold value table 35 and history data table 36.

The repeated field candidate detecting program 83*a*, the repeated field determining program 83*b*, the movement size determining program 83*c*, and the threshold value control program 83*d* need not be always stored in the ROM 83. For example, the repeated field candidate detecting program 83*a*, the repeated field determining program 83*b*, the movement size determining program 83*c*, and the threshold value control program 83*d* can be stored in a "portable physical medium" such as a flexible disk (FD), a compact disk-read only memory (CD-ROM), a magneto optic (MO) disk, a digital versatile disk (DVD), an integrated circuit (IC) card etc. that can be inserted into the computer system 80, a "fixed physical medium" such as an HDD that can be arranged inside or outside the computer system 80, "another computer system" that is connected to the computer system 80 via a public line, Internet, a local area network (LAN), a wide area network (WAN) etc. The repeated field candidate detecting program 83*a*, the repeated field determining program 83*b*, the movement size determining program 83*c*, and the threshold value control program 83*d* can be read by the computer system 80 from the media mentioned earlier and executed.

If an image includes less amount of movement or only local movement (for example, a blinking movement), a difference of a feature quantity (a field difference) decreases and a correlation between fields increases even for the fields other than a repeated field. Due to this, based on field data, a field other than the repeated field is likely to be determined as the repeated field. However, according to an embodiment of the present invention, when carrying out a 2:3 pulldown sequence detection on such an image, a 2:3 pulldown sequence detecting system reduces threshold values, thereby enabling to accurately detect the fields other than the repeated field similarly when the difference of the feature quantity is large. Due to this, the repeated field and the fields other than the repeated field can be accurately detected from input interlaced images and a regularity of occurrence (once in a five field cycle) of the repeated field can be accurately detected. Thus, because a detection error or a detection failure can be prevented, the 2:3 pulldown sequence can be precisely detected.

For example, in addition to the field data, if a movement size is less, the 2:3 pulldown sequence detecting system reduces the threshold values, thus enabling to determine whether the field is the repeated field by using a standard that is near a determination standard that is used to determine whether the field is the repeated field when the difference of the feature quantity is large. Thus, the pulldown sequence can be precisely detected.

According to an embodiment of the present invention, when carrying out the 2:3 pulldown sequence detection, the repeated field that indicates the field before two fields and that is inserted once in the five field cycle can be accurately detected. Thus, the 2:3 pulldown sequence can be precisely detected.

If the reduced threshold values are continuously used, the field which is normally determined as a field other than the repeated field is likely to be erroneously determined as the repeated field. However, according to an embodiment of the present invention, such an erroneous determination can be prevented.

In FIGS. 1A and 2B, the history data tables store the large bias flag and the small bias flag in each record. However, since the large and small bias flags take exclusive values or never takes am identical value at a time, the two flags may be put together into a single flag in a name such as "a large/small bias flag".

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of detecting a repeated field in a pulldown sequence detection from input interlaced images, comprising:
    comparing pixels of each field, as a first field, that forms the interlaced image with pixels of a third field one frame before the first field, calculating difference absolute values using a frame difference by the comparison, using first threshold values to determine a distribution bias of the difference absolute values, and detecting, from the interlaced image, a repeated field candidate that occurs once in a five field cycle and fields other than the repeated field;
    based on a regularity of repeated field occurrence, determining whether each of the repeated field candidates is the repeated field or not; and
    if one of the repeated field candidates is not determined to be the repeated field, changing the first threshold values to second threshold values, the second threshold values being smaller than the first threshold values.

2. The method according to claim 1, further comprising:
    comparing the pixels of each field (=the first field) with the pixels of the third field one frame before each field to find a frame difference;
    calculating a number of moving pixels in each field on the basis of the difference absolute values of the frame difference;
    if the number of moving pixels exceeds a predetermined threshold value, determining that the field includes movement;
    if the number of moving pixels is less than the predetermined threshold value, determining that the field includes less amount of movement, wherein
    the changing comprising changing the first threshold values to the second threshold values if one of the repeated field candidates is not the repeated field and if it is determined that the amount of movement is small.

3. The method according to claim 1, wherein the changing comprises, after changing the first threshold values to the second threshold values, reverting the second threshold values to the first threshold values in a field just before the repeated field that occurs once in the five field cycle.

4. A pulldown sequence detecting system that detects a repeated field in a pulldown sequence detection from input interlaced images, comprising:
    a repeated field candidate detecting unit that compares pixels of each field, as a first field, that forms the interlaced image with pixels of a third field one frame before the first field, calculates difference absolute values using a frame difference by the comparison, uses first threshold values to determine a distribution bias of the difference absolute values, and detects, from the interlaced image, a repeated field candidate that occurs once in a five field cycle and fields other than the repeated field;
    a repeated field determining unit that determines, based on a regularity of repeated field occurrence, whether each of the repeated field candidates detected by the repeated field candidate detecting unit is the repeated field or not; and
    a threshold value controller, responsive to a determination by the repeated field determining unit that one of the repeat field candidates is not the repeated field, for changing the first threshold values to second threshold values, the second threshold values being smaller than the first threshold values.

5. The pulldown sequence detecting system according to claim 4, further comprising:
    a movement size determining unit that:
        compares the pixels of each field (=the first field) with the pixels of the third field one frame before the first field to find a frame difference, calculates a number of moving pixels on the basis of the difference absolute values of the frame difference,
        if the number of moving pixels exceeds a predetermined threshold value, determines that the field includes movement, and
        if the number of moving pixels is less than the predetermined threshold value, determines that the field includes less amount of movement,
    wherein the threshold value controller changes the first threshold values to the second threshold values if one of the repeated field candidates is not the repeated field and if the movement size determining unit determines that the field includes less amount of movement.

6. The pulldown sequence detecting system according to claim 4, further comprising a unit that reverts, after changing the first threshold values to the second threshold values, in a field one field before the repeated field that occurs once in the five field cycle, the second threshold values to the first threshold values.

7. A computer-readable medium storing computer instructions for instructing a computer system to detect a repeated field in a pulldown sequence detection from input interlaced images, the computer instructions comprising:
    comparing pixels of each field, as a first field, that forms the interlaced image with pixels of a third field one frame before the first field, calculating difference absolute values using a frame difference by the comparison, using first threshold values to determine a distribution bias of the difference absolute values, and detecting, from the interlaced image, a repeated field candidate that occurs once in a five field cycle and fields other than the repeated field;

based on a regularity of repeated field occurrence, determining whether each of the repeated field candidates is the repeated field or not; and if one of the repeated field candidates is not determined to be the repeated field, changing the first threshold values to second threshold values, the second threshold values being smaller than the first threshold values.

8. The computer-readable medium according to claim 7, wherein the computer instructions further comprise:

comparing the pixels of each field (=the first field) with the pixels of the third field one frame before each field to fined a frame difference;

calculating a number of moving pixels on the basis of the difference absolute values of the frame difference;

if the number of moving pixels exceeds a predetermined threshold value, determining that the field includes movement; and if the number of moving pixels is less than the predetermined threshold value, determining that the field includes less amount of movement, wherein the changing comprises changing the first threshold values to the second threshold values if one of the repeated field candidates is not the repeated field and if it is determined that the amount of movement is small.

9. The method according to claim 7, wherein the changing comprises, after changing the first threshold values to the second threshold values, reverting the second threshold values to the first threshold values in a field just before the repeated field that occurs once in the five field cycle.

* * * * *